UNITED STATES PATENT OFFICE.

CHARLES HOSS, OF ST. LOUIS, MISSOURI, ASSIGNOR OF ONE-HALF TO HARRY J. SHALLER, OF ST. LOUIS, MISSOURI.

FIREPROOF MATERIAL.

1,111,021.     Specification of Letters Patent.     Patented Sept. 22, 1914.

No Drawing.     Application filed October 9, 1912.    Serial No. 724,709.

*To all whom it may concern:*

Be it known that I, CHARLES HOSS, a citizen of the United States, residing at St. Louis, Missouri, have invented a certain new and useful Improvement in Fireproof Material, of which the following is a full, clear, and exact description, such as will enable others skilled in the art to which it appertains to make and use the same.

This invention relates to compositions of matter, and has for its main object to provide an inexpensive and efficient fireproof material.

Another object is to provide a novel method of making fireproof material.

Briefly described, my improved material consists of a granular or shredded substance that is a poor conductor or non-conductor of heat, a binding agent mixed with said substance so as to hold it together, and a fireproofing agent thoroughly distributed through said mass.

The mixture above-described is molded or pressed into sheets or into any other desired shape, and is then preferably treated with a solution or substance that will impart stiffness and strength to the material. I prefer to form the material from sawdust, silicate of sodium and soapstone mixed together in a plastic or semi-plastic condition and mold it into flat sheets or any other desired shape, and then treat it with a chlorid of zinc solution, but I do not wish it to be understood that my invention is limited to the substance or ingredients above-mentioned for wood pulp could be used instead of sawdust, and any other suitable fireproofing agent could be used instead of the silicate of sodium.

By mixing the silicate of sodium and soapstone with the sawdust while it is wet or moist the particles of sawdust become coated with a binding agent and a fireproofing agent, thus producing a compact material in which the fireproofing substance is thoroughly distributed through the material. After the mixture of sawdust, soapstone and silicate of sodium has been molded or pressed into shape said mixture is treated with a hardening solution, preferably a solution formed of chlorid of zinc or of sulfid of zinc or calcium chlorid mixed with water. I have found in practice that an inexpensive and very efficient fireproof material can be produced from the following ingredients mixed together in approximately the proportions specified: sawdust, 46 parts, silicate of sodium, 26 parts, soapstone, 22 parts, and water 6 parts. After the ingredients above-mentioned have been thoroughly mixed together and molded so as to form a sheet or object said sheet or object is immersed in a solution consisting of about 25 parts of chlorid of zinc and 75 parts of water. I do not wish it to be understood, however, that the proportions above-mentioned are absolutely essential for they could be varied without departing from the spirit of my invention.

A substance or composition of the character above-described forms a very efficient fireproof material on account of the fact that the base or body of same consists of numerous small particles of sawdust or some other suitable material that is a non-conductor or poor conductor of heat, which particles are coated with a fireproofing agent. In other words, the fireproofing agent is thoroughly distributed throughout the substance that forms the base of the material in such a manner that the interior of the material is just as fireproof as the outer surface of the material irrespective of the thickness of the material. Such material is inexpensive to manufacture on account of the fact that the base of same consists of sawdust which is usually considered a waste product; the material is very light and exceptionally strong and is well adapted for fireproofing safes, thereby making it possible to build a fireproof safe that is light enough to be handled conveniently. When the material is made in sheet form it can be used as a fireproof lining for sheet metal structures, for covering studding so as to form partitions, and in various other ways for building purposes because it is stiff and strong and can be sawed as easily as boards. The particular purpose for which the material is used is, of course, immaterial so far as my invention is concerned, and, as previously stated, it is immaterial whether the material is made in sheet form or molded to form a finished object.

Having thus described my invention, what I claim as new and desire to secure by Letters Patent is:

1. A fireproof material comprising the following ingredients mixed in approximately the portions specified: sawdust, 46 parts, silicate of sodium, 26 parts, soapstone, 22 parts, and water, six parts.

2. A fireproof material consisting of a molded mixture comprising the following ingredients: approximately one-half sawdust, approximately one-fourth soapstone, water and zinc silicate.

In testimony whereof I hereunto affix my signature in the presence of two witnesses, this fourth day of October, 1912.

CHARLES HOSS.

Witnesses:
 WELLS L. CHURCH,
 GEORGE BAKEWELL.

---

Copies of this patent may be obtained for five cents each, by addressing the "Commissioner of Patents, Washington, D. C."